United States Patent [19]
Boltinghouse et al.

[11] 3,880,606
[45] Apr. 29, 1975

[54] METHOD OF PRODUCING A MASS UNBALANCED SPHERICAL GYROSCOPE ROTOR

[75] Inventors: Joseph C. Boltinghouse, Whittier; Alfred G. Gross, Jr., Santa Ana, both of Calif.

[73] Assignee: Rockwell International Corporation, El Segundo, Calif.

[22] Filed: Nov. 23, 1973

[21] Appl. No.: 418,630

Related U.S. Application Data

[63] Continuation of Ser. No. 263,025, June 15, 1972, abandoned.

[52] U.S. Cl. ............ 29/417; 29/557; 29/DIG. 47; 51/289 S; 51/324
[51] Int. Cl. ............................................ B23p 17/00
[58] Field of Search ............ 29/417, 557, DIG. 47; 74/5; 51/289 S, 324

[56] References Cited
UNITED STATES PATENTS
3,111,789   11/1963   Harmon ........................... 51/289 S
3,545,287   12/1970   Smith ............................... 74/5.7 X
3,591,915   7/1971    Roberts et al. ....................... 29/417
3,623,221   11/1971   Morton et al. ............. 29/DIG. 47 X

*Primary Examiner*—C. W. Lanham
*Assistant Examiner*—Victor A. Di Palma
*Attorney, Agent, or Firm*—H. Fredrick Hamann; Rolf M. Pitts; George Jameson

[57] ABSTRACT

The present disclosure is directed to a method for producing a mass unbalanced spherical rotor for a gyroscope wherein a cylindrical billet of material (preferably beryllium) is drilled along an axis displaced parallel to the cylindrical axis of the billet. A wire of metal, having a density different from the density of the billet metal is placed in the drilled hole. The cylindrical billet is then extruded or forged along the cylindrical axis of the billet to form a cylindrical rod having a diameter corresponding substantially to the diameter of the desired spherical rotor. The cylindrical rod is then cut into sections and machined to the finished spherical shape.

9 Claims, 14 Drawing Figures

AS MACHINED
(SPHERICAL)

AT TEMPERATURE
(PROLATE)

AT TEMPERATURE &
AT SPEED
(SPHERICAL)

//3,880,606

METHOD OF PRODUCING A MASS UNBALANCED SPHERICAL GYROSCOPE ROTOR

This is a continuation, of application Ser. No. 263,025, filed June 15, 1972, now abandoned.

BACKGROUND OF THE INVENTION

This invention relates to a method for fabricating a spherical rotor of the type used in an electrically suspended gyroscope (also called electrostatic gyroscope). Such gyroscopes employ a spherical rotor which may be either a solid sphere or a whole shell with a spherical exterior.

A prior art method for producing a spherical rotor is disclosed in U.S. Pat. No. 3,274,666, entitled "Method of Producing a Spherical Gyro Rotor," by Arnold T. Nordsiek. The method disclosed in that patent consists of rotating the body, in this case, the sphere, at a relatively low speed and sensing surface non-uniformities, which non-uniformities are then eliminated, and then rotating the sphere at the design speed while sensing the centrifugal distortion of the sphere and then altering the material and the surface of the sphere to perfect the dynamic sphericity of the sphere. This prior art rotor does not contain a purposely built in mass unbalance as is required in some types of electrically suspended gyroscopes.

For example, in U.S. patent application, Ser. No. 47,506, filed June 18, 1970, entitled "Mass Unbalanced Pickoff," by J. C. Boltinghouse and J. Atkinson, which application is assigned to North American Rockwell Corporation, there is disclosed a system, the heart of which is a mass unbalanced rotor, which rotor, when spun, causes a modulated output signal along its various pickoff axes, which signals are then combined to detect the orientation of the spin axis. In the past, the spherical rotor was plated on one-half of its surface with a metal layer. The plated layer caused a mass unbalance about the spin axis of the sphere.

The ideal rotor for an electrostatically suspended gyroscope is a very nearly perfect sphere. The rotor must be relatively light in weight and relatively rigid. For this reason, nearly all rotors are made of beryllium, a material with high modulus of elasticity and a very low density. The rotor is easier to fabricate if it is a solid sphere made in one piece by conventional machining techniques. If the rotor is hollow, it must be made in two or more pieces which must be joined. The mass balance of the rotor must be controlled such that the mass center does not deviate from the geometric center by more than a few microinches. With a solid rotor, this condition is met by using a homogeneous material. With a hollow rotor, preferential lapping techniques must be used to achieve mass unbalance.

The mass unbalance modulation pickoff technique described in the aforementioned referenced patent application permits a simple, easy-to-fabricate, rotor design. The plating of a rotor to produce a mass unbalance causes a sphericity error of approximately 2 microinches. This possibly could be avoided by machining small indentations into the rotor and filling the indentations with a dense material. Practical difficulties are encountered with this approach in that a small hole filled with a plug may entrap dirt or gas. A slight indentation could be filled by plating copper, gold or other alloy into the opening and then lapping the entire sphere. One of the difficulties here is that the lapping of materials of different hardness can result in machining errors. Another problem encountered is that the rotor oblates due to centrifugal stress when it spins. A 2 to 3 microinch sphericity error results from spin stress. Because the rotors are made of beryllium, which material is anisotropic with respect to the thermal coefficient of expansion, the rotor becomes either oblate or prolate if there is a temperature change from the temperature at which the rotor was machined into a sphere. All metals are crystalline in structure. Most structural metals are polycrystalline in their usable form. The properties of single crystals are determined by their atomic lattice configuration. Some crystals are based on cubic symmetry and have isotropic properties. Beryllium crystals are of the type known as hexagonal close-packed. Such crystals have nearly cylindrical symmetry but not spherical symmetry. The coefficient of thermal expansion, the modulus of elasticity, and other properties are different when measured along the axis of nearly cylindrical symmetry than when measured in a direction normal to the axis of the crystal. A sphere made of a large single crystal of beryllium would exhibit anisotropic properties. If the temperature were increased, the sphere would become oblate; if the temperature were decreased, the sphere would become prolate.

Commercially available beryllium of the grade used for instruments is normally sintered from finely divided particles of powdered beryllium metal. The powder is compacted in a mold under vacuum conditions at a temperature below the melting point. The sintered product is isotropic compared to the single crystal base metal because of the random orientation of the multitude of particles in the powder, each of which may be nearly single crystal and anisotropic. The powdered metal is formed by an attrition process wherein the particles tend to cleave along crystal planes. The result is that the particles on a statistical basis tend to have a tetrahedral shape which is elongated. They have been described as similar to grains of wheat. When compacted in a mold, there is a tendency for the elongated particles to align themselves statistically along the direction of press. The result is a material which exhibits anisotropy similar to the single crystal but to a lesser degree.

The anisotropic behavior of beryllium has been a detriment to its use in spherical rotors for gyroscopes. Not only does it affect a change in sphericity with temperature, but also the anisotropy in modulus of elasticity affects the change in shape due to centrifugal stress when the rotor spins. The preferred axis of the material is lost when the spherical rotor is machined. The axis of anisotropic symmetry is, therefore, randomly oriented with respect to the plating used to create the mass unbalance. If the rotor is operated at a temperature that is higher than its machining temperature, then the rotor not only changes shape, but the principal axes of inertia shift. The mass balance properties of the rotor also change.

This particular invention teaches a method to overcome the undesirable anisotropic effects of beryllium when used to manufacture electrically supported gyroscope rotors and a method to control the anisotropy such that it becomes a benefit to the overall design.

SUMMARY OF THE INVENTION

The invention is a method for producing a mass unbalanced spherical rotor for an electrostatic type gyroscope comprising the steps of first forming a cylindrical billet of metal (preferably beryllium), then drilling at least one hole through the billet along an axis displaced parallel to the cylindrical axis of the billet; next inserting a wire of metal having a density differing from the density of the billet material into the drilled opening. The prepared billet is then extruded along its cylindrical axis to form a cylindrical rod having a diameter corresponding substantially to the diameter of the desired spherical rotor. The cylindrical rod is subdivided into equal sections with each section having a length greater than the diameter of the desired spherical rotor. The cut sections are then machined into a spherical shape having a diameter corresponding to the rotor.

In a second method of the invention, the beryllium billet with the wire inserts in place is surrounded with a uniform thickness of steel in the form of a container. The area surrounding the beryllium is evacuated. The assembly is raised in temperature to approximately 850°C ± 100°C and the billet with the steel container is extruded into a cylindrical rod having an area reduction ratio of approximately 25 to 1 as compared to the cylindrical billet. The cylindrical rod is then soaked in a diluted nitric acid bath to remove the steel.

The cylindrical rod is then cut into sections, with the sections then being machined into individual spherical rotors.

From the foregoing, it can be seen that it is an object of the present invention to provide a method for fabricating a spherical rotor.

It is another object of the present invention to provide a method of manufacturing spherical rotors with a selected mass unbalance.

It is a further object of the present invention to provide a method of manufacturing spherical rotors from beryllium wherein the rotor is anisotropic with respect to the thermal coefficient of expansion along a selected axis.

It is a further object of the present invention to provide a rotor which is mass unbalanced and spherical at speed.

These and other objects of the present invention will become more apparent when taken in conjunction with the following description and drawings, which drawings form a part of this specification and wherein like numbers indicate like parts.

DESCRIPTION OF THE PREFERRED EMBODIMENTS

Figure 1:
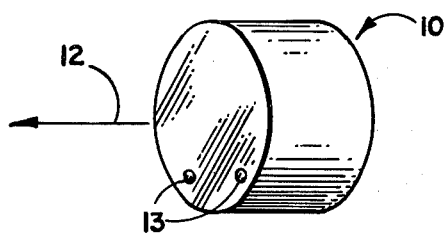
FIG. 1 illustrates a cylindrical billet drilled with wires in place.

Referring to FIG. 1, an elongated cylindrical billet of beryllium material 10, having a cylindrical axis 12 is shown with two holes drilled parallel to the cylindrical axis 12 but displaced therefrom. The holes are drilled approximately 70° apart. Inserted in the holes are two metal wires 13 having a density substantially different from the density of the beryllium material. The wires may, for example, be made from silver which is nonreactive chemically with the beryllium. The beryllium billet preferably is made from particles of powdered beryllium which are compacted in a mold under vacuum conditions at a temperature below the melting point.

In the preferred embodiment, two wires are used to provide an improved dynamic balance to the finished rotor. If only one wire were used, it can be shown that the finished rotor would have two stable axes of rotation rather than the desired one.

Figure 2:
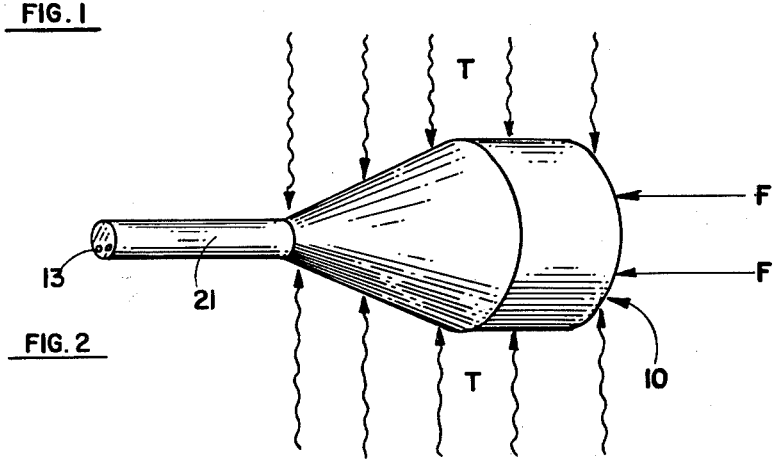
FIG. 2 illustrates in schematic form the step of the billets being extruded into a cylindrical rod.
Figure 3:
FIG. 3 illustrates the step of cutting the cylindrical rod into sections.
Figure 4:
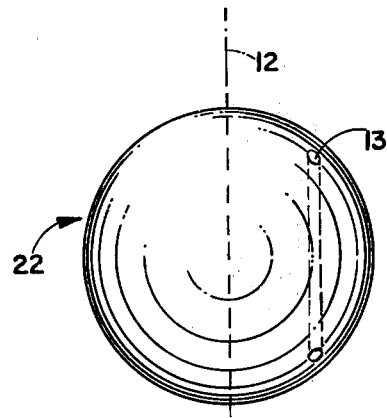
FIG. 4 illustrates the spherically machined rotors.

In FIG. 2, the billet 10 is shown schematically being extruded under a pressure F and a heat T in a press (not shown) to form a cylindrical rod 21 containing the wires 13 with diameters substantially smaller than in the billet 10. In operation, it has been found that a ratio of 25 to 1 in size delivers the proper results. The temperature presently used is 850°C ± 100°C. The extruded rods are then cut into sections 22 as shown in FIG. 3, the lengths of which are greater than the finished diameter of the spherical rotor shown in FIG. 4. Each one of the sections is then machined into a sphere, as shown in FIG. 4. When the rotor is machined spherically, if it is spun at the operating frequency it will oblate due to centrifugal force causing an error because of its non-spherical shape. The problem is solved by controlling the area reduction ratio of extrusion. When the appropriate area reduction ratio is used, the crystal axes of nearly cylindrical symmetry of the crystals forming the cylindrical rod are statistically aligned, in the desired degree, perpendicular to the axis of the rod. Each crystal is anisotropic in behavior therefor by raising the temperature of the rotor, the rotor will prolate with the major axis of expansion being parallel to the axis of the cylindrical rod and the inserted wires. With the spin axis also being parallel to the major axis of expansion, it is possible, by adjusting temperature and/or speed of rotation, to cause the rotor to become perfectly spherical.

Figure 5A:
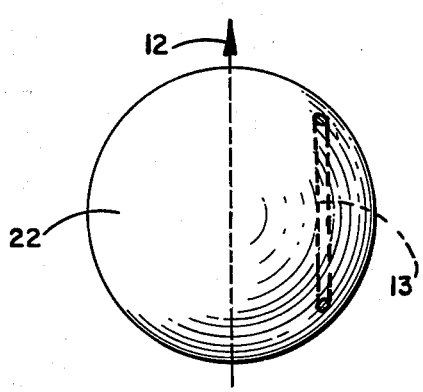
FIGS. 5a, 5b and 5c illustrate the finished machined rotor at rest, at temperature, and at speed and temperature, respectively.
Figure 5B:
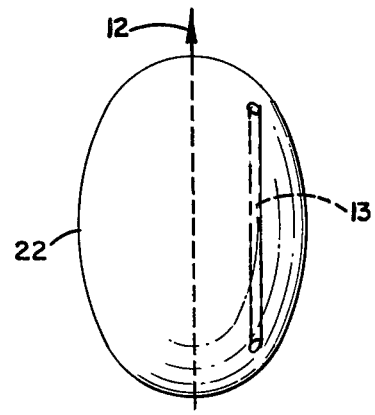
Figure 5C:
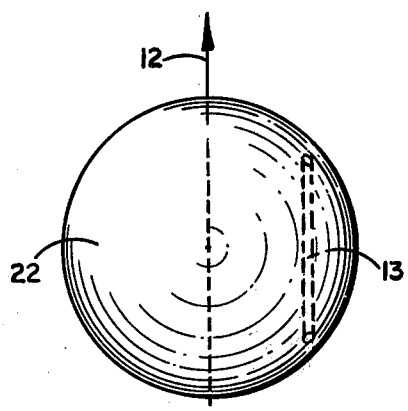

In FIG. 5a, the machined spherical rotor is shown with the cylindrical axis 12 parallel to the inserted wires 13. In FIG. 5b, the sphere 22 is shown prolated at an increased temperature. In FIG. 5c, the rotor is spun about a cylindrical axis 12 to cause it to resume its spherical shape.

Figure 6:
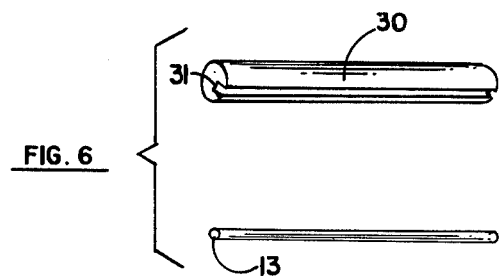
FIG. 6 illustrates in an exploded view a second embodiment of an insert.
Figure 7:
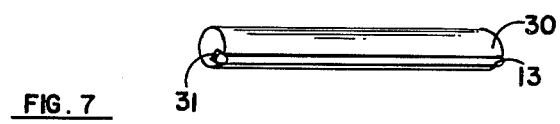
FIG. 7 illustrates the insert assembled, ready for insertion into a drilled billet.

Referring to FIG. 6, a cylindrical rod 30 of beryllium metal is routed along its axial length to form a groove 31 for receiving the wire 13. In FIG. 7, the mass unbalance wire 13, which may be silver metal, is pressed into the groove 31.

Figure 8:
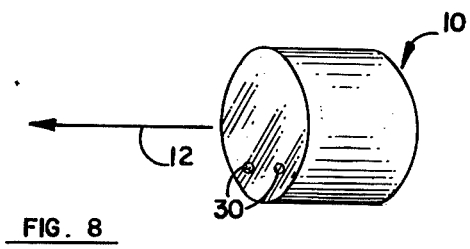
FIG. 8 illustrates a drilled billet with the inserts in place.

In FIG. 8, the billet 10 is shown drilled along axes displaced from the central axis 12 with the combined insert 30 and wire 13 being inserted into the drilled openings.

Figure 9:
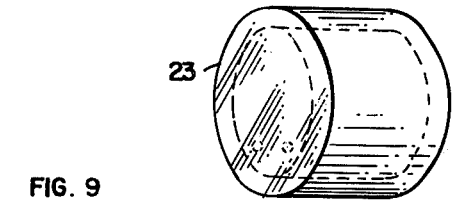
FIG. 9 illustrates a proposed billet surrounded with a steel jacket.

In FIG. 9, the next step of the method is shown. The billet 10 with the wires in place, is completely surrounded with a steel jacket 23, which jacket is finally sealed hermetically by welding in a vacuum.

Figure 10:
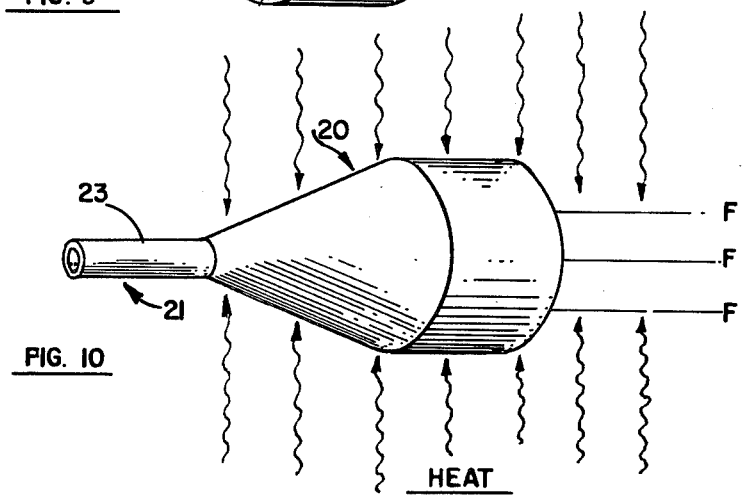
FIG. 10 illustrates the billet being extruded under heat and pressure into a cylindrical rod.

In FIG. 10, the entire assembly is heated and extruded to form the cylindrical rod 21. A layer of steel surrounds the inner beryllium rod. The extruded rod is then soaked in a diluted solution of nitric acid to dissolve the steel jacket.

Figure 11:
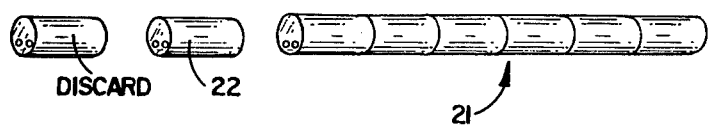
FIG. 11 illustrates the rod being cut into sections.
Figure 12:
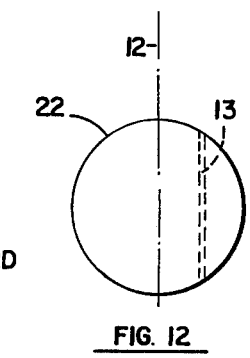
FIG. 12 illustrates the rod sections machined into spherical form.

In FIG. 11, the rod, which is now a beryllium rod having the two wire inserts positioned along its axial length, is cut into segments 22 with the forward and rearmost segment being discarded due to non-uniformity. Each segment is then machined and lapped, using standard techniques, into the desired spherical shape as shown in FIG. 12 wherein these metal removal operations do not alter the parallel alignment of the cylindrical axis 12 and the axes of the wires 13.

As previously stated, commercially available beryllium of the grades used for instruments is normally sintered from finely divided particles of powdered beryllium metal. The powder is compacted in a mold under vacuum conditions at a temperature below the melting point. The sintered product is isotropic compared to the single crystal base metal because of the random orientation of the multitude of particles in the powder, each of which may be nearly single crystal and anisotropic. The powdered metal is formed by an attrition process. The particles, therefore, tend to cleave along crystal planes. The result is that the particles on a statistical basis tend to have a tetrahedral shape which is elongated. When compacted in the mold, there is a tendency for the elongated particles to align themselves statistically. This results in a material which exhibits a measurable degree of anisotropy. This property is the undesirable one which is in effect turned inside out by the extrusion process. The grains which had their quari-cylindrical-symmetry crystal axes oriented along the direction of press now have these axes oriented radially and tangentially and this causes the rotor to become prolate when heated. This allows the rotor to be adjusted to a perfect sphere by increasing the operating temperature to cause the rotor to extend physically along its rotational axis an amount equal to the prolation caused by the centrifugal force indigenous to the speed of rotation.

The specification has designed a method using a billet of hot pressed beryllium having anisotropic symmetry along the direction of press, but opposite in sign to that which is desired. The extrusion ratio of 25 to 1 produces a pattern with the quasi-cylindrical-symmetry crystal axis aligned radially and tangentially. It is believed that this high extrusion ratio would have the same result if the initial billet had some other form because the "memory" of the crystals is in effect wiped out. At lower extrusion ratios, some remmant of the character of the initial billet would survive. Thus, 25 to 1 ratio results in a very uniform product although other ratios (perhaps as low as 3 to 1) may in fact be usable. Such lower values might become desirable should one choose to decrease the magnitude of the thermal expansion anisotropy in the extruded rod in order to balance out with some lower speed of rotation.

While there has been shown what are considered to be the preferred embodiments of the invention, it will be manifest that many changes and modifications may be made therein without departing from the essential spirit of the invention.

It is intended, therefore, in the annexed claims to cover all such changes and modifications that may fall within the true scope of the invention.

We claim:

1. A method for producing a mass unbalanced spherical gyroscope rotor comprising in combination the steps of:

forming a billet of metal into a right circular cylinder having a diameter greater than the diameter of the finished gyroscope rotor;

drilling at least one hole through said cylindrical billet along an axis parallel to the cylinder axis and displaced therefrom;

inserting wire of a density different than the metal of said billet into the drilled hole;

extruding said billet of metal along its cylindrical axis to form a rod having a diameter greater than the diameter of the gyroscope rotor;

cutting said rod into sections with the lengths of the sections being greater than the diameter of the gyroscope rotor; and lapping each section into a spherical rotor.

2. The method for producing a mass unbalanced spherical rotor according to claim 1 wherein said forming step includes the step of fabricating said billet from beryllium.

3. The method of producing a mass unbalanced spherical rotor according to claim 1 further comprising the steps of:

placing a steel jacket around said billet with the wire in place before the extruding step; and removing said steel jacket from said rod after the extruding step.

4. A method for producing a mass unbalanced spherical gyroscope rotor comprising in combination the steps of:

forming a billet of metal into a right circular cylinder having a diameter substantially greater than the diameter of the gyroscope rotor;

drilling at least one hole through said billet along an axis parallel to and displaced from the cylinder's axis;

forming an insert of material identical to the billet material for insertion into the drilled hole;

routing a groove along the length of the insert;

placing a wire of metal having a density different than the billet material into the groove of the insert;

inserting the insert with wire in place into the hole in the billet material;

extruding said billet of metal along its cylindrical axis to form a rod having a diameter greater than the diameter of the gyroscope rotor;

cutting said rod into sections with the lengths of the sections being greater than the diameter of the gyroscope rotor; and lapping each section into a spherical rotor.

5. The method for producing a mass unbalanced spherical rotor according to claim 4 further comprising the steps of:

placing a steel jacket around said billet with the wire in place before the extruding step; and removing said steel jacket from said rod after the extruding step.

6. A method for producing a mass unbalanced spherical gyroscope rotor comprising the steps of:

fabricating a billet of metal into a preselected configuration having a first axis;
forming at least one aperture through said billet along an axis parallel to the first axis and displaced therefrom;
inserting wire of a density different than that of the metal of said billet into the aperture;
extruding said billet along its first axis to form a rod having a diameter slightly greater than the diameter of the gyroscope rotor;
cutting the rod into sections; and
lapping each section into a spherical rotor.

7. A method for producing a mass unbalanced spherical gyroscope rotor comprising the steps of:
fabricating a billet of a first metal into a preselected configuration having a first axis;
forming at least one aperture through said billet along an axis parallel to and displaced from the first axis;
making an insert of the first metal for insertion into the drilled opening;
routing a groove along the length of the insert;
placing a wire of a second metal into the groove of the insert;
inserting the insert with the wire in place into the aperture in said billet;
extruding said billet along its first axis to form a rod having a diameter greater than the diameter of the gyroscope rotor;
cutting said rod into sections; and
lapping each section into a spherical rotor.

8. The method for producing a mass unbalanced spherical gyroscope rotor according to claim 7 further comprising the steps of:
placing a jacket of a third metal around said billet with the wire in place before the extruding step; and
removing said jacket from said rod after the extruding step.

9. A method for producing a mass unbalanced spherical gyroscope rotor comprising the steps of:
fabricating a billet of a first metal into a preselected configuration having a first axis;
forming a plurality of openings through said billet along a plurality of axes parallel to the first axis and displaced therefrom;
inserting a second metal in each of the plurality of openings;
extruding said billet along its first axis to form a rod having a diameter greater than the diameter of the gyroscope rotor;
cutting said rod into sections; and
lapping each of said sections into a spherical rotor.

* * * * *